Patented Jan. 18, 1938

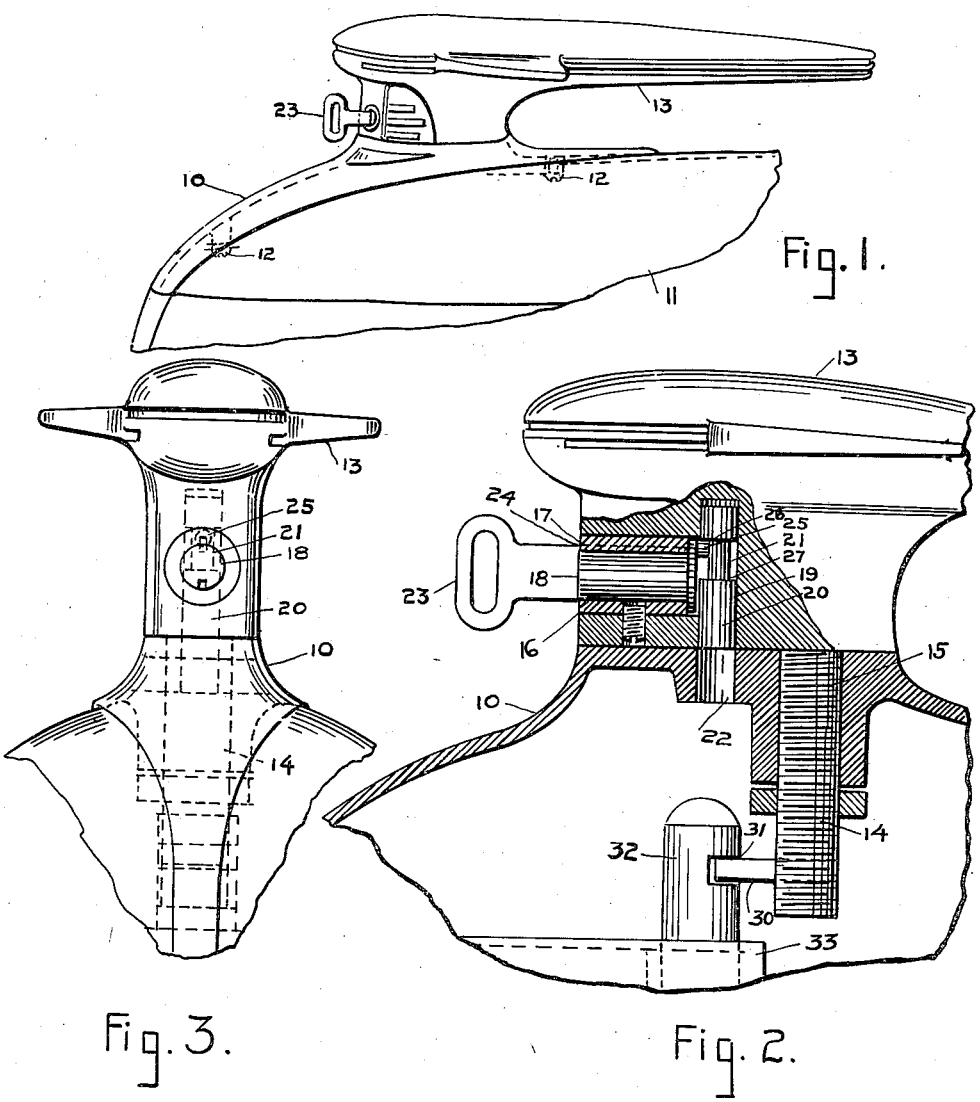

2,105,912

UNITED STATES PATENT OFFICE 2,105,912

LOCKING HANDLE FOR AUTOMOBILE HOODS

Lester K. Franklin, Chicago, Ill.

Application December 7, 1936, Serial No. 114,634

3 Claims. (Cl. 70—215)

This invention relates to a device adapted to act as an ornament for the top forwardmost part of the hood and also as a locking handle for locking the hood of an automobile.

A feature of the current models of some of the present day automobiles is the hood adapted to be raised by one lifting movement of a front handle. Because this handle appears in the most conspicuous place it tends to spoil the appearance of the automobile. Among the objects of my invention is to combine the front hood ornament of the car with this handle in the same streamlined motif of the car so as to have the double function of acting as the car ornament as well as the handle for raising the hood. Another object of my invention is to inclose a locking device in my combination handle and ornament so as to lock the hood against thieves and tamperers—said locking means being so hidden as to not interfere with the design features of my ornament and handle, and so constructed that when in locked position it prevents the handle from being turned.

Referring to the drawing, Fig. 1 is a perspective view of my combination ornament with locking handle for automobile hoods with a key inserted; Fig. 2 is a side view partly broken away to show a section of my locking mechanism; Fig. 3 is a front view of my construction.

My invention also comprises such other objects, advantages and capabilities as will later more fully appear and which are inherently possessed by my invention.

While I have shown in the accompanying drawing a preferred embodiment of my invention, yet I wish it understood that the same is susceptible of modification and change without departing from the spirit of my invention.

Referring to the embodiment selected to illustrate my invention, a hood bracket 10 is attached to the forwardmost top portion of the hood 11 by a pair of screws 12 or the like. An ornament 13 has a bolt 14 on its underside which passes through an opening 15 in the bracket 10 for fastening the ornament to the hood 11. Adjacent the front of the ornament 13 is a hollowed out portion 16 extending from the open face 17 back into the interior of the ornament 13 and housing a locking cylinder 18. At the rear of the hollowed out portion 16, a passage 19 extending vertically through the bottom of the ornament 13 through and beyond the hollowed out portion 16 houses an upright cylinder or bolt 20 having a circular recess 21. The bracket 10 has a recess 22 immediately below the passage 19 so as to receive the bottom end of bolt 20.

In use my ornament 13 functions as a handle so that if the user desires to lift the hood he employs the ornament as a handle for that purpose and also for closing the hood. The ornament 13 when in normal position holds bolt 14 so that projection 30 carried thereby is held within recess 31 in stud 32 anchored in the top portion of the radiator construction 33 of the automobile. When the user turns the ornament 13 as a handle, a bolt 14 is turned carrying projection 30 free of the recess 31 and permitting the hood to be lifted. With my device the handle may be locked against turning so that the hood may be locked or unlocked at the sole pleasure of the owner of the key. When the ornament is in normal position the hood is held in normally closed position by projection 30 in recess 31. The ornament in normal position is also normally locked because the bolt 20 is positioned in the recess 22. If the owner desires to unlock the handle to turn the same he inserts a key 23 into the key-hole 24 of the locking cylinder 18 adjacent the face 17 of the ornament 13, and upon movement of the key, the key turns the cylinder 18. The cylinder 18 has at its inner end a projection 25 which turns with the cylinder. Said projection is placed within the circular recess 21 of the bolt 20. When the key is turned for unlocking, the cylinder 18 is turned moving the projection 25 so that it moves upwardly within the circular recess 21 and pulls the plunger upwardly by engaging the upper shoulder 26 above circular recess 21. When the key is used for locking, the cylinder 18 is turned and moves the projection 25 downwardly so that it engages the lower shoulder 27 below the circular recess 21 and moves the plunger down into recess 22.

It is within the contemplation of my invention that I may attach my combination ornament and locking handle directly to the hood of an automobile without bracket 10 by any suitable means. It is also within the contemplation of my invention that recess 22 should in that case be located in the hood of the automobile. As a variation I may also have the locking bolt of my ornament adapted to fit into an adapter instead of into a recess in either the bracket or hood.

Having thus described my invention, I claim:

1. In a lock for use with the hood of an automobile adapted to be opened and closed from the front portion thereof and having a bracket positioned at substantially the forwardmost top portion of the hood and a body member having a lower portion attached to said bracket, a bolt extending below the lower portion and carrying adjacent its lower end a projection, said projection adapted to normally lie within a recess of a stud anchored in the top portion of the radiator construction of the automobile so as to latch the hood against vertical movement, an upper portion forming a turnable handle, said handle attached to said bolt and adapted upon being turned to turn said bolt and move the projection out of said recess to thereby permit vertical movement of the hood, the lower portion of said body member having a hollowed out portion extending inwardly and transversely from its face, a locking cylinder housed in said hollowed out portion, said lower portion of said body member having at the rear of said hollowed out portion a vertically extending passage connecting at its lower end with a recess in the bracket, a bolt housed in said passage and having a circular recess, said locking cylinder having at its inner end a projection positioned within said circular recess, said locking cylinder adapted to receive and to be turned by a key fitted thereto, so that upon turning the key to locking position said key turns said cylinder which carries the projection downwardly to engage the lower shoulder of the bolt below the circular recess to pull the bolt down into the recess in the bracket and prevent turning of the handle, and upon said key being turned to unlocking position said key turns said locking cylinder and carries the projection upwardly to engage the upper shoulder of the bolt above the circular recess to pull the bolt above the recess in the bracket to permit turning of the handle.

2. In a lock for use with the hood of an automobile adapted to be opened and closed from the front portion thereof and having a body member positioned at substantially the forwardmost top portion of the hood, said body member comprising a lower portion attached to said hood, a bolt extending below the lower portion and carrying adjacent its lower end a projection, said projection adapted to normally lie within a recess of a stud anchored in the top portion of the radiator construction of the automobile so as to latch the hood against vertical movement, an upper portion forming a turnable handle, said handle attached to said bolt and adapted upon being turned to turn said bolt and move the projection out of said recess to thereby permit vertical movement of the hood, the lower portion of said body member having a hollowed out portion extending inwardly and transversely from its face, a locking cylinder housed in said hollowed out portion, said lower portion of said body member having at the rear of said hollowed out portion a vertically extending passage connecting at its lower end with a recess in the hood, a bolt housed in said passage and having a circular recess, said locking cylinder having at its inner end a projection positioned within said circular recess, said locking cylinder adapted to receive and to be turned by a key fitted thereto, so that upon turning the key to locking position said key turns said cylinder which carries the projection downwardly to engage the lower shoulder of the bolt below the circular recess to pull the bolt down in to the recess in the hood and prevent turning of the handle, and upon said key being turned to unlocking position said key turns said locking cylinder and carries the projection upwardly to engage the upper shoulder of the bolt above the circular recess to pull the bolt above the recess in the hood to permit turning of the handle.

3. In a lock for use with the hood of an automobile adapted to be opened and closed from the front portion thereof and having a bracket positioned at substantially the forwardmost top portion of the hood, a turnable body member, a bolt extending below the body member and carrying adjacent its lower end a projection, said projection adapted to normally lie within a recess of a stud anchored in the top portion of the radiator construction of the automobile so as to latch the hood against vertical movement, an upper portion on the body member forming a handle, said handle attached to the said bolt by the body member and adapted upon being turned to turn said bolt and move the projection out of said recess to thereby permit vertical movement of the hood, a portion of said body member having a hollowed out portion, a locking cylinder housed in said hollowed out portion, said body member having a vertically extending passage laterally offset from the axis of the bolt and communicating at its lower end with a recess in the bracket, a locking bolt housed in said passage, said locking cylinder at its inner end having a projection adapted to engage the locking bolt in the passage, said locking cylinder being adapted to receive and be turned by a key fitted thereto, whereby upon turning the key, the locking bolt may be moved into and out of the recess in the bracket.

LESTER K. FRANKLIN.